United States Patent
Lee et al.

(10) Patent No.: US 9,778,346 B2
(45) Date of Patent: Oct. 3, 2017

(54) CONSTANT FALSE ALARM RATE DEVICE FOR SIGNAL DETECTION SYSTEM

(71) Applicant: Electronics and Telecommunications Research Institute, Daejeon (KR)

(72) Inventors: Mi-Young Lee, Daejeon (KR); Bon-Tae Koo, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 300 days.

(21) Appl. No.: 14/682,210

(22) Filed: Apr. 9, 2015

(65) Prior Publication Data

US 2015/0293208 A1 Oct. 15, 2015

(30) Foreign Application Priority Data

Apr. 9, 2014 (KR) .................... 10-2014-0042463

(51) Int. Cl.
*G01S 7/34* (2006.01)
*G01S 7/02* (2006.01)
*G01S 7/292* (2006.01)
*G01S 7/35* (2006.01)
*G01S 7/40* (2006.01)
*G01S 7/52* (2006.01)
(Continued)

(52) U.S. Cl.
CPC .............. *G01S 7/023* (2013.01); *G01S 7/292* (2013.01); *G01S 7/354* (2013.01); *G01S 7/4021* (2013.01); *G01S 7/52004* (2013.01); *G01S 7/527* (2013.01); *G01S 7/536* (2013.01)

(58) Field of Classification Search
CPC ................................ G01S 7/023; G01S 7/292
USPC ....................... 342/89–91, 93, 159
See application file for complete search history.

(56) References Cited

U.S. PATENT DOCUMENTS 5,038,145 A * 8/1991 DeCesare ............. G01S 7/2922
342/159
5,179,712 A * 1/1993 Abboud .................... G06F 7/24
340/146.2
(Continued)

OTHER PUBLICATIONS

R. Perez-Andrade, R. Cumplido, C. Feregrino-Uribe and F. M. Del Campo, "A versatile hardware architecture for a CFAR detector based on a linear insertion sorter," 2008 International Conference on Field Programmable Logic and Applications, Heidelberg, 2008, pp. 467-470.*

(Continued)

*Primary Examiner* — Marcus Windrich
(74) *Attorney, Agent, or Firm* — William Park & Associates Ltd.

(57) ABSTRACT

A constant false alarm rate (CFAR) device for a signal detection system is disclosed herein. The CFAR device includes a first signal selection unit and a second signal selection unit. The first signal selection unit receives a last signal of a lagging sorting array and signals of one or more lagging guard cells, selects any one of the last signal of the lagging sorting array and the signals of the one or more lagging guard cell as a test signal based on a received guard cell size, and outputs the test signal. The second signal selection unit receives the test signal and signals of one or more leading guard cells, selects any one of the test signal and the signals of the one or more leading guard cells based on the guard cell size, and transfers this selected signal to the leading sorting array.

15 Claims, 2 Drawing Sheets

(51) Int. Cl.
   *G01S 7/527*   (2006.01)
   *G01S 7/536*   (2006.01)

(56) References Cited

U.S. PATENT DOCUMENTS 5,499,030 A * 3/1996 Wicks ................... G01S 7/292
                                                    342/159
2013/0201054 A1* 8/2013 Wang ................. G01S 13/0218
                                                    342/93

OTHER PUBLICATIONS

A. Moustafa, F. M. Ahmed, K. H. Moustafa and Y. Halwagy, "A new CFAR processor based on guard cells information," 2012 IEEE Radar Conference, Atlanta, GA, 2012, pp. 0133-0137.*

Roberto Perez-Andrade et al., A versatile hardware architecture for a constant false alarm rate processor based on a linear insertion sorter, Digital Signal Processing, Feb. 2010, pp. 1733-1747, Elsevier Inc.

* cited by examiner

CONSTANT FALSE ALARM RATE DEVICE FOR SIGNAL DETECTION SYSTEM

CROSS-REFERENCE TO RELATED APPLICATION

This application claims the benefit of Korean Patent Application No. 10-2014-0042463, filed Apr. 9, 2014, which is hereby incorporated by reference herein in its entirety.

BACKGROUND

1. Technical Field

The present disclosure relates generally to a constant false alarm rate (CFAR) device for a signal detection system and, more particularly, to a CFAR device that is capable of detecting a target signal in interference waves from a signal detection system, such as radar or sonar.

2. Description of the Related Art

Signal detection systems, such as radar or sonar, use a CFAR algorithm in order to detect a target signal from a signal including background noise, an interference signal, clutter, reverberations, etc.

That is, a CFAR algorithm is responsible for a function of detecting a target signal in radar or the like by comparing the sizes of an interference wave and a signal.

CFAR modules have details that vary depending on an applied CFAR algorithm. However, these CFAR modules calculate an interference wave based on adjacent frequency signals, compares the size of the calculated interference wave with that of a test signal, and detects the test signal as a target when the size of the test signal is larger than that of the interference wave by a predetermined value, in the same manner. The adjacent frequency signals become prior signals (adjacent frequency signals of lower frequencies) and posterior signals (adjacent frequency signals of higher frequencies) in connection with the frequency of the test signal.

The paper "A Versatile Hardware Architecture for a Constant False Alarm Rate Processor based on a Linear Insertion Sorter, Roberto Perez-Andrade et al., Digital Signal Processing 20 2010 1733-1747" discloses hardware in which the most widely used ordered statistics CFAR (OS-CFAR) and cell average CFAR (CA-CFAR) have been implemented together.

The structure of the CFAR hardware (also referred to as a "CFAR processor") described in the paper is illustrated in FIG. 1. The CFAR processor of FIG. 1 includes two sorting basic cell (SBC) sorting arrays 1a and 1b for 2n reference cells, (2m+1) shift registers 2 for guard cells, and a cell under test (CUT) 3 located between the registers 2. In this case, the CUT 30 may be more appropriately referred to as a test signal cell, and a signal input to the test signal cell may be referred to as a test signal CUT. The CFAR processor of FIG. 1 includes two multiplexers 4a and 4b having n inputs and a single output that perform a rank operation for the lagging and leading sorting arrays.

In connection with CFAR, in interference wave evaluation, frequencies immediately adjacent to a signal under test are generally excluded. This exerts influence that increases the size of adjacent frequency signals when a signal is a target and the signal size level of this signal is high. For this reason, when the signal levels of immediately adjacent frequencies are used in interference wave analysis, the accuracy of the analysis is degraded. The adjacent frequency regions excluded from interference wave signal analysis as described above correspond to the guard cell parts of the shift registers 2 in FIG. 1.

Meanwhile, in the case where the structure of FIG. 1 is employed without change, when a guard cell size is changed, hardware design code must be modified, or recombination is required even when design has been performed using a guard cell number as a parameter (i.e., parameterized design has been performed).

As a related technology, Korean Patent No. 1040315 entitled "Target Detection Apparatus Adaptive to Clutter Environment" discloses a technology in which a determination criterion used to determine the presence of a target signal is dualized and the determination criterion is adaptively changed depending on a current clutter environment, thereby improving the performance of target signal detection.

SUMMARY

At least one embodiment of the present invention is directed to the provision of a CFAR device for a signal detection system, which enables various guard cell sizes to be applied, thereby eliminating the need for redesign and recombination.

In accordance with an aspect of the present invention, there is provided a CFAR device for a signal detection system, including a first signal selection unit configured to receive a last signal of a lagging sorting array and signals of one or more lagging guard cells, and to select any one of the last signal of the lagging sorting array and the signals of the one or more lagging guard cell as a test signal based on a received guard cell size and then output the test signal; and a second signal selection unit configured to receive the test signal and signals of one or more leading guard cells, and to select any one of the test signal and the signals of the one or more leading guard cells based on the guard cell size and transfer this selected signal to the leading sorting array.

The first signal selection unit may have (a maximum guard cell size+1) inputs and a single output.

The number of the lagging guard cells may be identical to the maximum guard cell size.

When the maximum guard cell size is 2, the first signal selection unit may receive a last signal of the lagging sorting array, a signal of a first lagging guard cell, and a signal of a second lagging guard cell.

When the guard cell size is "0," the first signal selection unit may select and output the last signal of the lagging sorting array.

When the guard cell size is "1," the first signal selection unit may select and output the signal of the first lagging guard cell.

When the guard cell size is "2," the first signal selection unit may select and output the signal of the second lagging guard cell.

The second signal selection unit may have (a maximum guard cell size+1) inputs and a single output.

The number of the leading guard cells may be identical to the maximum guard cell size.

When the maximum guard cell size is 2, the second signal selection unit may receive a signal of a test signal cell, a signal of a first leading guard cell, and a signal of a second leading guard cell.

When the guard cell size is "0," the second signal selection unit selects and outputs the signal of the test signal cell.

When the guard cell size is "1," the second signal selection unit may select and output the signal of the first leading guard cell.

When the guard cell size is "2," the first second selection unit may select and output the signal of the second leading guard cell.

A signal holding unit configured to hold the output signal of the first signal selection unit may be installed at the output terminal of the first signal selection unit.

The signal holding unit may include a flip-flop.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
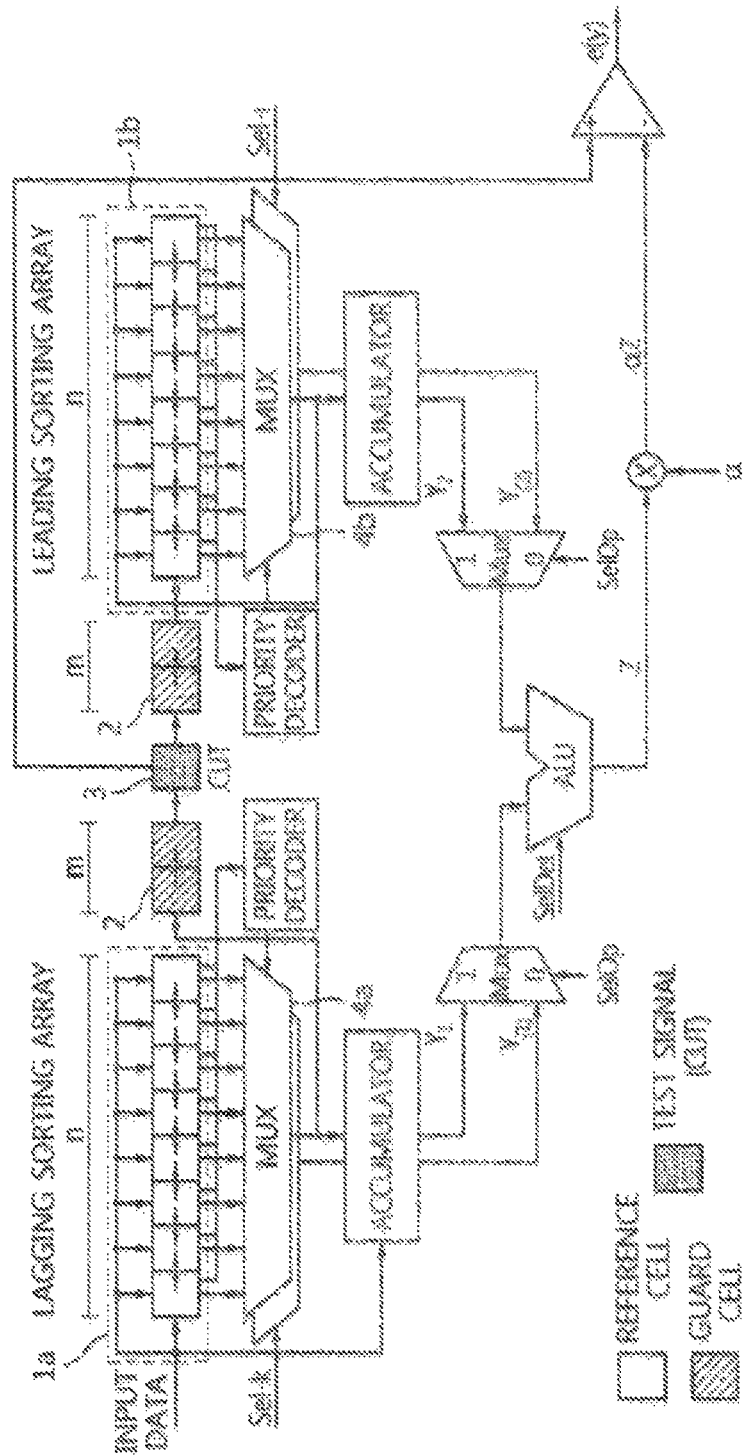
FIG. 1 is a diagram of the structure of a conventional CFAR hardware.

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/ or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Figure 2:
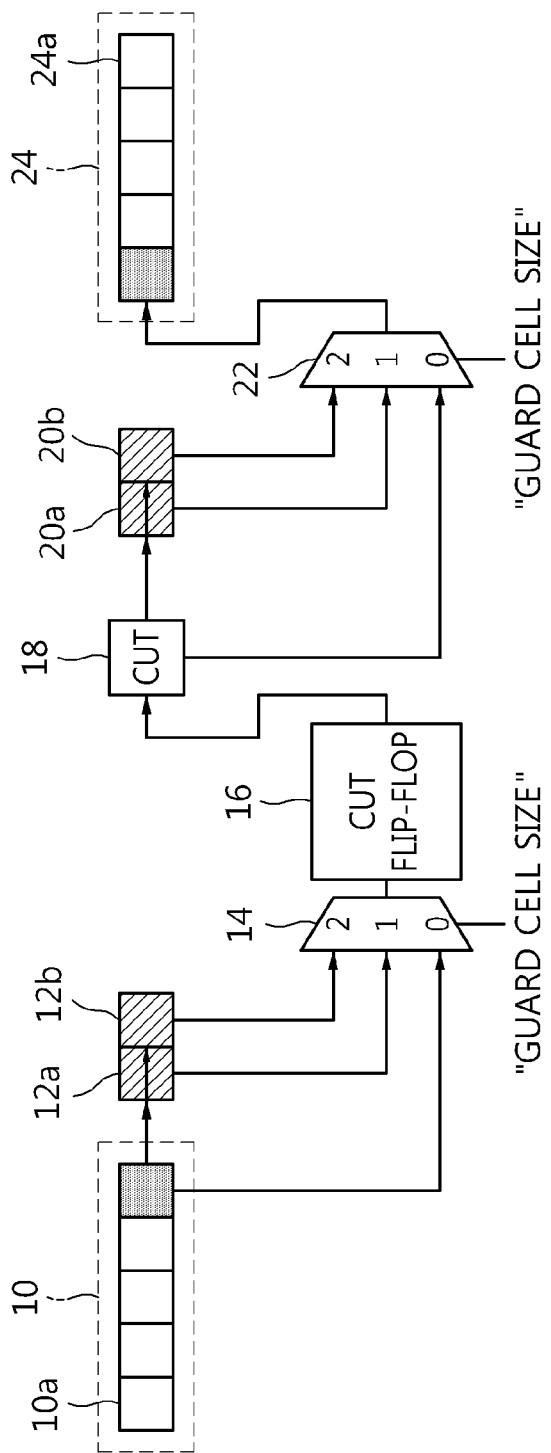
FIG. 2 is a configuration diagram of a CFAR device for a signal detection system according to an embodiment of the present invention.

FIG. 2 is a configuration diagram of a CFAR device for a signal detection system according to an embodiment of the present invention.

The CFAR device for a signal detection system according to the present embodiment includes a first signal selection unit 14, a signal holding unit 16, and a second signal selection unit 22.

The first signal selection unit 14 receives a last signal of a lagging sorting array 10 and signals of one or more lagging guard cells 12a and 12b. The first signal selection unit 14 selects any one of the last signal of the lagging sorting array 10 and the signals of the one or more lagging guard cells 12a and 12b as a test signal CUT based on an input guard cell size, and outputs the selected signal.

In this case, the lagging sorting array 10 includes a plurality of sliding window cells 10a. A signal inside the lagging sorting array 10 (i.e., a signal input to the leftmost sliding window cell) may be input to a leading sorting array 24 through a test signal cell 18 by a right shift operation.

A last signal of the lagging sorting array 10, a signal of a first lagging guard cell, a signal of a second lagging guard cell, . . . , and a signal of a last lagging guard cell may be sequentially input into the test signal cell 18. The first signal selection unit 14 selects a corresponding signal of the input signals as a test signal CUT based on a guard cell size, and transfers the selected signal to the test signal cell 18.

The first signal selection unit 14 may be composed of a multiplexer having (a maximum guard cell size+1) inputs and a single output.

For example, when a maximum guard cell size is 2, the first signal selection unit 14 receives a last signal of the lagging sorting array 10, a signal of the first lagging guard cell 12a, and a signal of the second lagging guard cell 12b. When the maximum guard cell size is 2, the signal of the second lagging guard cell 12b is the signal of the last lagging guard cell in FIG. 2.

Meanwhile, when a guard cell size of "0" is input in the state in which the maximum guard cell size is 2, the first signal selection unit 14 may select and output the last signal of the lagging sorting array 10.

When a guard cell size of "1" is input in the state in which the maximum guard cell size is 2, the first signal selection unit 14 may select and output the signal of the first lagging guard cell 12a.

When a guard cell size of "2" is input in the state in which the maximum guard cell size is 2, the first signal selection unit 14 may select and output the signal of the second lagging guard cell 12b.

It is preferred that the number of lagging guard cells 12a and 12b is the same as the maximum guard cell size.

The signal holding unit 16 holds the output signal of the first signal selection unit 14. That is, the signal holding unit 16 is installed at the output terminal of the first signal selection unit 14, and thus holds the output signal of the first signal selection unit 14 without change. The signal holding unit 16 may be viewed as a type of stabilization means. Preferably, the signal holding unit 16 may be composed of a flip-flop.

Meanwhile, the second signal selection unit 22 receives a signal CUT of the test signal cell 18 and signals of one or more leading guard cells 20a and 20b. The second signal selection unit 22 selects any one of the signal CUT of the test signal cell 18 and the signals of the one or more leading guard cells 20a and 20b based on an input guard cell size, and transfers the selected signal to the leading sorting array 24.

In this case, the leading sorting array 24 includes a plurality of sliding window cells 24a. A signal inside the signal leading sorting array 24 (i.e., a signal input the leftmost sliding window cell) may be output by a right shift operation.

The second signal selection unit 22 may be composed of a multiplexer having (a maximum guard cell size+1) inputs and a single output.

For example, when a maximum guard cell size is 2, the second signal selection unit 22 receives a signal of the test signal cell 18, a signal of the first leading guard cell 20a, and a signal of the second leading guard cell 20b. When the maximum guard cell size is 2, the signal of the second leading guard cell 20b is the signal of the last leading guard cell in FIG. 2.

Meanwhile, when a guard cell size of "0" is input in the state in which the maximum guard cell size is 2, the second signal selection unit 22 may select and output the signal of the test signal cell 18, and then may transfer the selected signal to the leading sorting array 24.

When a guard cell size of "1" is input in the state in which the maximum guard cell size is 2, the second signal selection unit 22 may select the signal of the first leading guard cell 20a, and then may transfer the selected signal to the leading sorting array 24.

When a guard cell size of "2" is input in the state in which the maximum guard cell size is 2, the second signal selection unit 22 may select the signal of the second leading guard cell 20b, and then may transfer the selected signal to the leading sorting array 24.

It is preferred that the number of leading guard cells 20a and 20b is the same as the maximum guard cell size.

Next, the operation of a CFAR device for a signal detection system according to an embodiment of the present invention is described.

First, it is assumed that the maximum guard cell size is preset to "2." Furthermore, it is assumed that prior or posterior guard cells for a test signal CUT are implemented using shift registers. For ease of description, it is assumed that signals are input in ascending order of frequency, signals are input to the lagging sorting array 10, and a new signal is input to the leading sorting array 24 through the test signal cell 18 by the right shift operation of the shift registers.

Accordingly, the rightmost cells of the lagging sorting array 10 and the leading sorting array 24 have the lowest frequency signals, and the leftmost cells thereof have the highest frequency signals. The leftmost cells of the lagging sorting array 10 and the leading sorting array 24 may be called first cells.

Signals input from the lagging sorting array 10 to the test signal cell 18 as described above may be input in the sequence of the "last signal of the lagging sorting array," the "signal of the first lagging guard cell," the "signal of the second lagging guard cell," . . . , the "signal of the last lagging guard cell." In this case, the first signal selection unit 14 selects any one signal based on an input guard cell size.

That is, in FIG. 2, the first signal selection unit 14 selects one among "the last signal of the lagging sorting array 10," "the signal of the first lagging guard cell 12a," and "the signal of the second lagging guard cell 12b" based on whether the input guard cell size is 0, 1, or 2 in the state in which the maximum guard cell size is 2. For example, the first signal selection unit 14 selects the last signal of the lagging sorting array 10 when the input guard cell size is "0," selects the signal of the first lagging guard cell 12a when the guard cell size is "1," and selects the signal of the second lagging guard cell 12b when the guard cell size "2."

Thereafter, the signals selected and output by the first signal selection unit 14 as described above may be input to the leading sorting array 24 through the signal holding unit 16 in the sequence of "the signal of the test signal cell," "the signal of the first leading guard cell," "the signal of the second leading guard cell," . . . , "the signal of the last leading guard cell." In this case, the second signal selection unit 22 selects any one signal based on the input guard cell size.

That is, in FIG. 2, the second signal selection unit 22 selects one among the "signal of the test signal cell 18," the "signal of the first leading guard cell 20a" and the "signal of the second leading guard cell 20b" depending on whether the input guard cell size is 0, 1 or 2 in the state in which the maximum guard cell size is 2. For example, the second signal selection unit 22 selects the signal of the test signal cell 18 when the input guard cell size is "0," selects the signal of the first leading guard cell 20a when the guard cell size is "1," and selects the signal of the second leading guard cell 20b when the guard cell size is "2."

According to the present invention configured as described above, various guard cell sizes can be applied when CFAR hardware capable of executing various CFAR algorithms is implemented, and thus it is not necessary to modify (i.e., redesign) hardware design code or to combine again (recombine) the guard cell number.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. A constant false alarm rate (CFAR) device for a signal detection system, comprising:
    a first signal selection unit configured to receive a last signal of a lagging sorting array and signals of one or more lagging guard cells, and to select any one of the last signal of the lagging sorting array and the signals of the one or more lagging guard cell as a test signal based on a received guard cell size and then output the test signal; and
    a second signal selection unit configured to receive the test signal and signals of one or more leading guard cells, and to select any one of the test signal and the signals of the one or more leading guard cells based on the guard cell size and transfer this selected signal to the leading sorting array.

2. The CFAR device of claim 1, wherein the first signal selection unit has (a maximum guard cell size+1) inputs and a single output.

3. The CFAR device of claim 2, wherein a number of the lagging guard cells is identical to the maximum guard cell size.

4. The CFAR device of claim 3, wherein when the maximum guard cell size is 2, the first signal selection unit receives a last signal of the lagging sorting array, a signal of a first lagging guard cell, and a signal of a second lagging guard cell.

5. The CFAR device of claim 4, wherein when the guard cell size is "0," the first signal selection unit selects and outputs the last signal of the lagging sorting array.

6. The CFAR device of claim 4, wherein when the guard cell size is "1," the first signal selection unit selects and outputs the signal of the first lagging guard cell.

7. The CFAR device of claim 4, wherein when the guard cell size is "2," the first signal selection unit selects and outputs the signal of the second lagging guard cell.

8. The CFAR device of claim 1, wherein the second signal selection unit has (a maximum guard cell size+1) inputs and a single output.

9. The CFAR device of claim 8, wherein a number of the leading guard cells is identical to the maximum guard cell size.

10. The CFAR device of claim 9, wherein when the maximum guard cell size is 2, the second signal selection unit receives a signal of a test signal cell, a signal of a first leading guard cell, and a signal of a second leading guard cell.

11. The CFAR device of claim 10, wherein when the guard cell size is "0," the second signal selection unit selects and outputs the signal of the test signal cell.

12. The CFAR device of claim 10, wherein when the guard cell size is "1," the second signal selection unit selects and outputs the signal of the first leading guard cell.

13. The CFAR device of claim 10, wherein when the guard cell size is "2," the first second selection unit selects and outputs the signal of the second leading guard cell.

14. The CFAR device of claim 1, wherein a signal holding unit configured to hold the output signal of the first signal selection unit is installed at an output terminal of the first signal selection unit.

15. The CFAR device of claim 14, wherein the signal holding unit comprises a flip-flop.

* * * * *